United States Patent [19]
Garner

[11] 3,866,987
[45] Feb. 18, 1975

[54] DRILL BIT WITH LAMINATED FRICTION BEARING

[75] Inventor: Lloyd L. Garner, Los Alamitos, Calif.

[73] Assignee: Smith International, Inc., Newport Beach, Calif.

[22] Filed: Jan. 14, 1974

[21] Appl. No.: 433,068

[52] U.S. Cl. .................................. 308/8.2, 175/371
[51] Int. Cl. ............................................ F16c 19/00
[58] Field of Search ............. 175/371, 359; 308/8.2, 308/DIG. 4, DIG. 5, DIG. 8, DIG. 9

[56] References Cited
UNITED STATES PATENTS

| | | | |
|---|---|---|---|
| 2,592,277 | 4/1952 | Hammer | 308/8.2 X |
| 2,595,903 | 5/1952 | Swart | 308/8.2 |
| 2,653,062 | 9/1953 | Sperisen | 308/DIG. 4 |

FOREIGN PATENTS OR APPLICATIONS

| | | | |
|---|---|---|---|
| 23,351 | 10/1969 | U.S.S.R. | 175/371 |

Primary Examiner—Robert S. Ward, Jr.
Assistant Examiner—Gene A. Church

[57] ABSTRACT

A drill bit bearing assembly having a rotary cutter on a bit leg journal located between a conventional bearing assembly and a rotary cutter seal characterized by two or more concentric relatively wide flat rings between concentric bearing surfaces in the rotary cone cutter and on the leg journal, adjacent ring surfaces and bearing surfaces being in rotary frictional contact and said adjacent surfaces having different coefficients of friction, the rings being of a width such as to substantially fill the space between the ball bearing assembly and the seal, and said rings desirably having openings therethrough between their inner and outer circumferential surfaces, the openings being filled with a dry lubricant, and the openings in adjacent ring surfaces being staggered.

9 Claims, 5 Drawing Figures

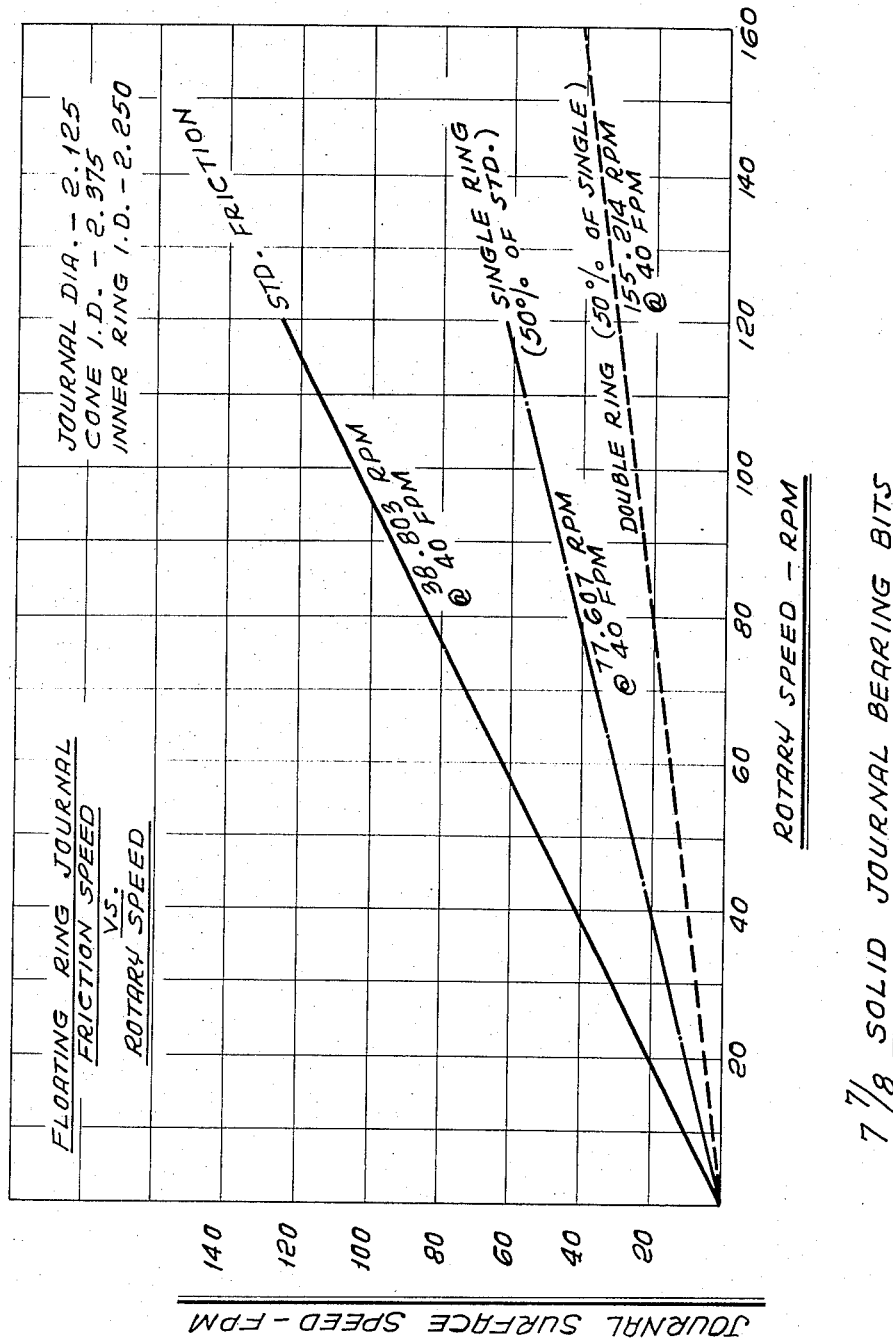

DRILL BIT WITH LAMINATED FRICTION BEARING

DISCLOSURE

The invention relates to bearing assemblies, and more particularly to a flat multiple concentric ring assembly adapted to fit between complementary annular bearing surfaces within a rotary cone cutter and about the exterior of a drill bit leg journal upon which the cutter rotates.

Certain drilling operations, because of the weight on the drill and the shocks encountered in drilling, have previously made it advisable to provide rotary cutter rock bits with friction bearings rather than roller bearings because of the increased strength of the friction bearing, i.e., an inner circumferential bearing surface in the cone rotating upon a complementary outer circumferential bearing surface about the cutter leg.

These friction bearings can be used with complementary ball bearing assemblies but the friction bearings have been designed to bear most of the weight and shock.

The principal drawback of the use of friction bearings has been that the speed of rotation of the rotary cutter on the leg journal is quite limited and this limitation in cutter speed entails a proportional limitation on the speed of the entire drill bit.

The use of roller bearings instead of friction bearings permits the bits to be run at higher speeds but their life is limited, the weight and shock of operation causing galling and shortening the life of the entire bit.

The general object of this invention is to provide a bearing assembly at the approximate location of a roller bearing unit and the location of the friction bearing in the two types of bearings, which comprises two or more concentric rings or bands of bearing material which act as friction bearing elements between each other and between a complementary internal bearing band in the rotary cutter and a cooperating external bearing band about the leg journal of the cutter body. The concentric rings or bands, two or more in number, serve in the manner of reduction gearing between the rotary cutter and the leg journal so that cutter speed can be increased materially without a corresponding increase in the surface speed of adjacent bearing surfaces. If a single bearing ring were used between the leg journal bearing surface and the internal rotary cutter friction bearing surface, the journal speed between adjacent friction surface could be maintained while increasing the rotary speed of the cutter a considerable amount. Likewise, at the same journal surface speed, with a double bearing ring interposed between the journal and the cutter, the rotary speed of the cutter could be increased approximately twice as much and of course even greater benefits would be derived using a bearing assembly comprising triple rings interposed between the leg journal and the cutter.

More specifically, it is an object of the invention to provide two or more bearing rings between the leg journal and the cutter wherein adjacent rings have different coefficients of friction and the bearing surfaces of the leg journal and the rotary cutter have coefficients of friction different from those of the bearing rings with which they are in rotary frictional engagement.

A further object of the invention is to provide a floating bearing ring assembly of two or more rings between the leg journal and the interior of the rotary cutter wherein the rings in cross section are relatively wide and thin, the widths of the bands taking up most of the available space between the inwardly positioned ball bearings and the outer seal between the cutter and the leg journal.

A further object of the invention is to provide a multiple floating ring bearing assembly wherein the rings have openings therethrough which are filled with solid lubricant to prevent galling at both sides of the ring, and wherein the openings in one ring are staggered axially relative to the openings in an adjacent ring.

Still another object of the invention is to provide a multiple floating bearing ring assembly which can be used advantageously between hard metal bearing inserts about the exterior of the leg journal and the interior of the rotary cutter.

The above and other objects and advantages of the invention will more fully appear from the following description in connection with the accompanying drawings:

FIG. 5 is a curve illustrating the comparative journal surface speeds and rotary tool speeds of a standard friction bearing compared with a single ring bearing and a double ring bearing.

Figure 1:
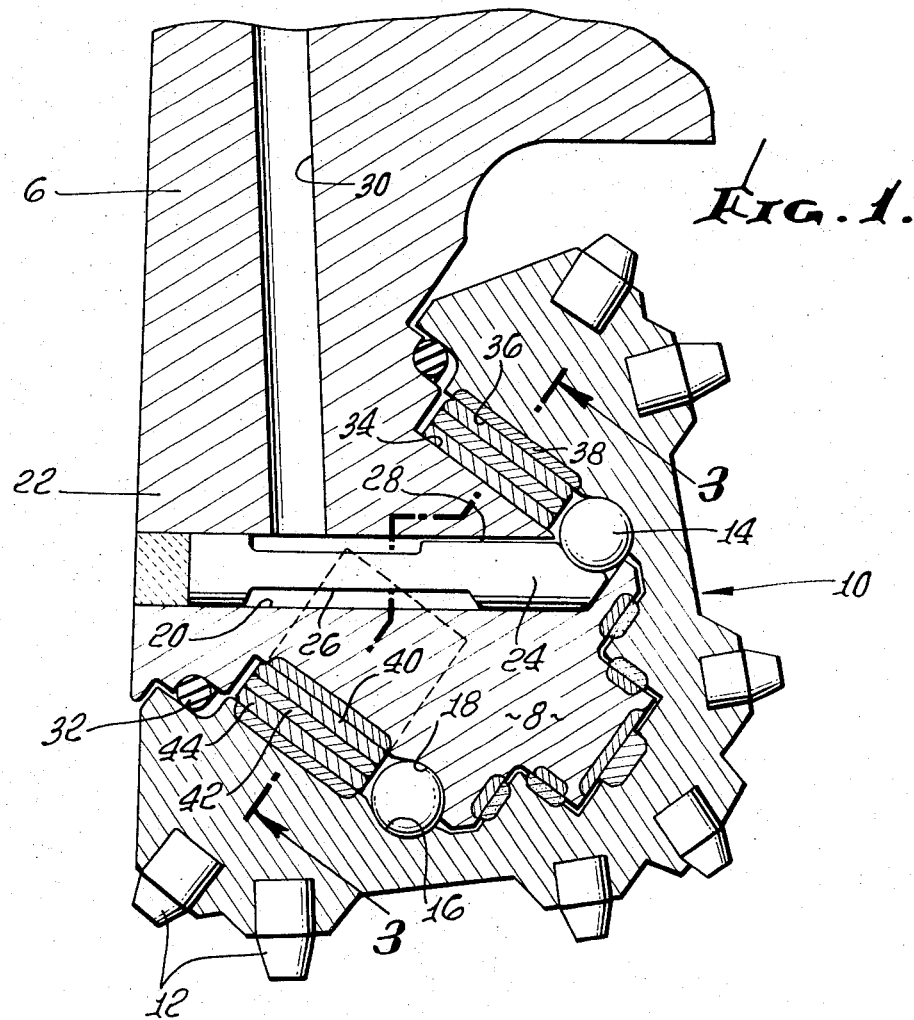
FIG. 1 is a vertical sectional view through the lower portion of a bit body having an integral leg journal upon which is rotatably mounted a rotary cone cutter, an embodiment of the invention being incorporated therein.

The drawings illustrate a portion of a conventional rock bit body 6 having a leg journal 8. Normally, the bit body 6 has three downwardly extending legs and each has a leg journal extending downwardly and inwardly toward the rotational axis of the entire tool.

Mounted for rotation on the leg journal 8 is a rotary cutter indicated generally at 10, the cutter preferably being provided with a plurality of tungsten carbide inserts 12, as is well known in the art.

Between an interior portion of the rotary cutter 10 and the leg journal 8 is a ball bearing assembly 14, the balls being located between an inner circumferential race 16 in the interior of the rotary cutter and an outer circumferential race 18 about the leg journal 8. These balls are placed in position through a bore 20 extending in from the face of the shirttail portion 22 of each leg of the cutter body 6, the balls being held in place by a plug 24 having a reduced intermediate portion 26 and a flattened portion 28 to permit the flow of lubricant to the ball bearings 14. The lubricant is supplied from a suitable reservoir, not shown, through a passage 30 which communicates with the bore 20 at the reduced intermediate portion 26 of the plug 24. From that point, lubricant flows over the flattened plug portion 28 to the ball bearing assembly and also to other areas between the leg journal 8 and the cutter 10.

To prevent the escape of lubricant from inside the rotary cutter 10 and also, and equally important, to prevent drilling mud and formation cuttings from entering into the bearing areas and other space between the leg journal 8 and the cutter 10, I provide a seal 32. This may be in the form of an O-ring as indicated, or a Belleville type spring, such as is also used in the drilling art.

Between the ball bearing assembly 14 and the O-ring seal 32, there is an annular bearing surface 34 about the leg journal 8. Outwardly concentric thereto and about the interior of the rotary cone 10 is an opposed bearing surface 36 which is shown defined by a hard metal insert 38 formed by a weld overlay, as is well known in the art. If desired, the leg journal bearing surface 34 can be provided with hard metal in the same manner. Interposed between the concentric leg journal and cutter bearing surfaces 34 and 36, I have illustrated three concentric bearing rings or bands 40, 42 and 44. These rings are in rotary frictional contact with each other and the inner surface of ring 40 is in similar rotary frictional contact with the leg journal surface 34, and the outer surface of the outer ring 44 is in rotary frictional contact with the rotary cone cutter bearing surface 36.

The coefficient of friction of each of the three bearing rings 40, 42 and 44 is different from that of the ring with which it is in frictional engagement, and that of each of rings 40 and 44 is different from the coefficient of friction of the leg journal bearing surface 34 and the rotary cutter bearing surface 36 respectively. These several coefficients of friction are so related that when the bit body 6 is rotated with the cutter engaging the formation to be drilled, the cutter will rotate faster than the bearing ring 44, ring 44 will rotate faster than bearing ring 42, and bearing ring 40 will rotate relatively slowly on the leg journal bearing surface 34. Thus, there is permitted an increase in speed of rotation of the drill bit as a whole and the rotary cutter 10. This increase in speed is far beyond that which would be possible with a conventional friction bearing with the internal bearing surface of the rotary cutter in rotary frictional contact with the external bearing surface of the leg journal.

Figure 2:
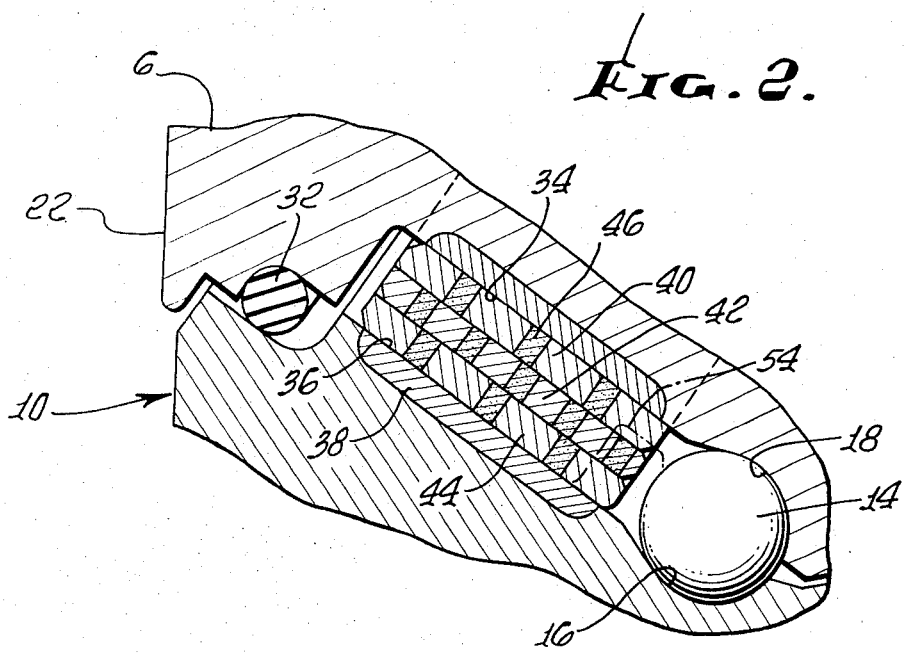
FIG. 2 is an enlarged sectional detail through portions of the leg journal and cone cutter, illustrating the utilization of solid lubricant in the floating bearing rings.
Figure 3:
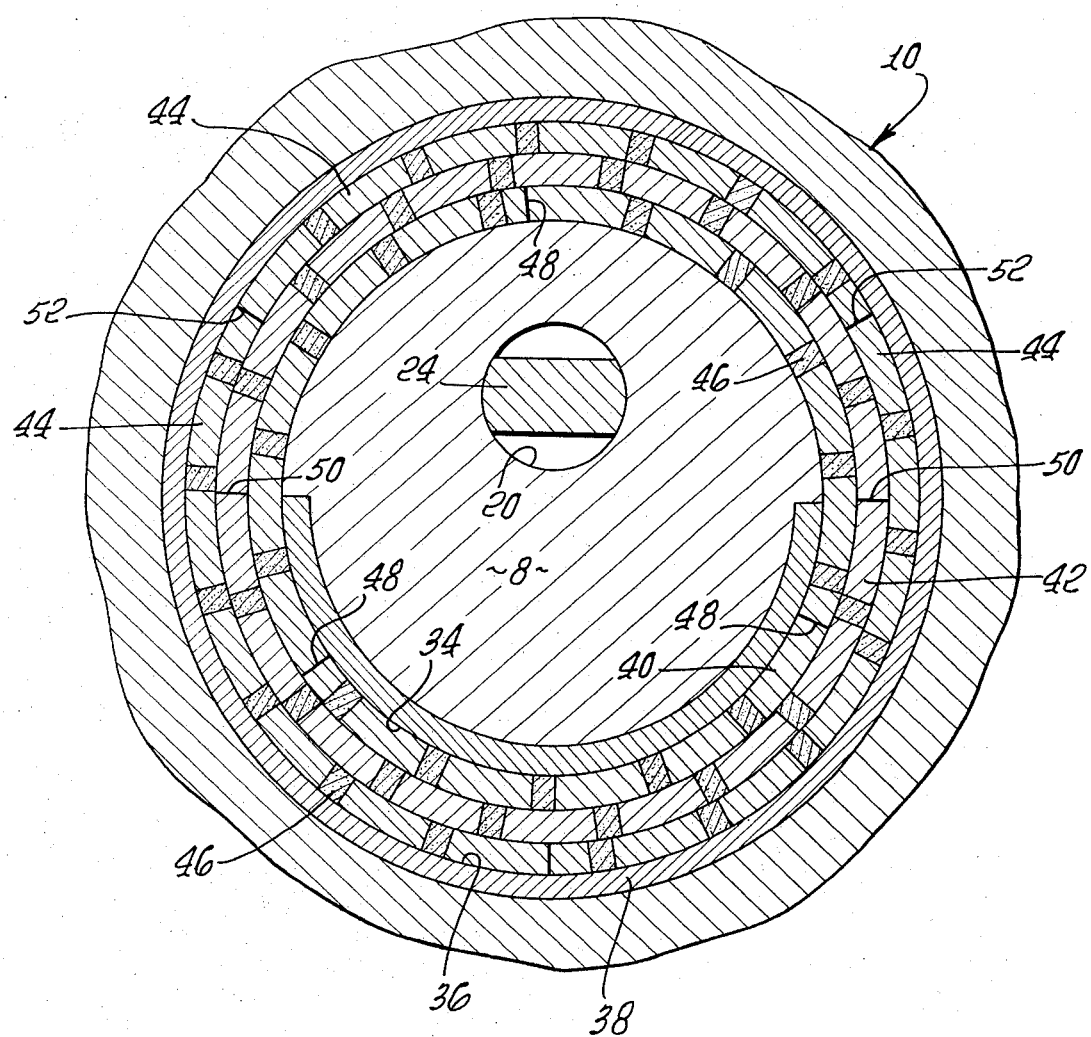
FIG. 3 is an enlarged section taken approximately on the line 3—3 of FIG. 1.
Figure 4:
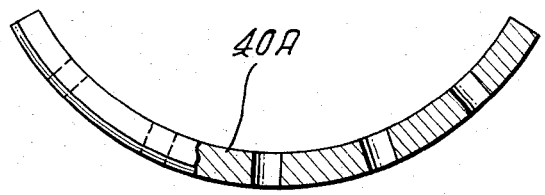
FIG. 4 is an enlarged side view partially in vertical section of a segment of one of the bearing rings.

In FIGS. 2, 3 and 4, the bearing rings 40, 42 and 44 are shown provided with holes therethrough which are filled with solid lubricant 46. There are several types of such solid lubricants known in the art. With the several bearing rings of the invention, it should be noted in FIG. 2 that the lubricant filled holes of adjacent bearing rings are staggered or offset relative to each other, thereby providing relatively wide areas of contact between the dry lubricant and an adjacent bearing ring surface.

In FIG. 4 there is illustrated a bearing ring segment 40A, which is a part of the inner bearing ring 40. Bearing ring 40 is made up of three segments with breaks or separations at 48. Segmentation of the bearing ring provides for better contact of the ring with the surface about which and within which it moves, and also facilitates lubrication.

The middle bearing ring 42 can if desired be made up of two segments with separations at two points 50. If desired, the outer ring 44 can be provided with three segments, separation being at three points 52.

With a multiple ring or band bearing assembly, such as shown and described, it is possible to secure the strength and longer life characteristics of a conventional two-part friction bearing and the rotary drill speed advantages of a roller bearing bit because of the wide friction bearing surfaces afforded and the gear reducing characteristics provided by the multiple bearing rings. This can be accomplished with or without the provision of the dry lubricant feature mentioned above.

In FIG. 2 there is shown a broken line 54 which represents a radial flange about the inside of the cutter 10, which in conventional constructions not only served to help retain the ball bearing elements 14 but also served as an end thrust ring and retainer for a conventional roller bearing assembly lying on the opposite side of the flange 54 from the balls 14. This flange 54 is referred to because it can be seen that with the elimination of the roller bearings, the bearing rings 40, 42 and 44 can be made quite wide to provide as great an amount of bearing surface as possible. The rings are seen to take up most of the space between the roller bearings 14 and the O-ring seal 32.

It should be noted in FIG. 5 that the line representing the standard friction bearing (one wherein the cone bearing surface 36 would ride directly upon the leg journal bearing surface 34), with a drilling rig rotary table speed of 38.8 RPM, the journal surface speed in feet per minute is 40. Using a single ring between the cone and leg journal surfaces, while maintaining a journal surface speed of approximately 40 ft./min., the drilling rig rotary table speed can be increased from 38.8 to 77.6 RPM, and with a double ring bearing between the cone and the leg journal, the drilling rig rotary table can be rotated at 155.2 RPM with the journal surface speed maintained at 40 ft./min. The tremendous advantage of the multiple ring bearing assembly thus becomes apparent. The advantages of increased drilling speed with the longer life characteristics of a friction bearing provide decided advantages over the old friction bearing and the roller type cutter bearing.

The chart of FIG. 5 reflects total indexing or 100 percent gear reduction. In other words, it reflects the ultimate possible achievement based upon a perfect coefficiency of friction relationship between the indexing surface of the journal, the cone and the intermediate bearing rings. In reality, somewhat less than 100 percent efficiency occurs, depending upon friction material combinations, design tolerance accumulations and other variables.

It will of course be understood that various changes can be made in the form, details, arrangement and proportions of the various parts without departing from the spirit of the invention.

I claim:

1. A bearing assembly for a drill bit having a leg journal and a rotary cutter thereon, the leg journal and cutter having concentric opposed surfaces of revolution comprising bearing surfaces, wherein the improvement comprises: at least a pair of concentric friction bearing rings, one ring comprising an inner ring in rotary sliding contact with the leg journal bearing surface, an outer ring in rotary sliding contact with the rotary cutter bearing surface, and said concentric rings being in frictional engagement and rotatable relative to each other.

2. The structure in claim 1, and said rings having axial widths greater than their radial thicknesses.

3. The structure in claim 1, and at least one of said rings and an adjacent bearing surface having different coefficients of friction.

4. The structure in claim 1, and each of said rings having a different coefficient of friction from the ring adjacent thereto.

5. The structure in claim 1, and said rings having openings therethrough from one friction surface to the other, and solid lubricant in the openings.

6. The structure in claim 5, and the openings in one ring being staggered relative to those in an adjacent ring.

7. The structure in claim 1, and said rotary cutter having an open end, said leg journal and said cutter having a ball bearing assembly between them inwardly from the open end of the rotary cutter, a seal between the rotary cutter and the leg journal adjacent the open end of the rotary cutter and axially spaced from the ball bearing assembly, and said friction bearing rings being located and occupying most of the space between the ball bearing assembly and the seal.

8. The structure in claim 1, and there being an outer friction bearing ring, an inner ring and an intermediate ring, the intermediate ring having a different coefficient of friction than the outer and inner rings.

9. The structure in claim 8, and the outer and inner rings each having a different coefficient of friction than that of the bearing surface of its respective rotary cutter and leg journal.

* * * * *